(12) United States Patent
Goldberg et al.

(10) Patent No.: US 7,470,905 B1
(45) Date of Patent: Dec. 30, 2008

(54) HIGH Z MATERIAL DETECTION SYSTEM AND METHOD

(75) Inventors: Jacques Goldberg, Haifa (IL); Isaac Shpantzer, Bethesda, MD (US); Yaakov Achiam, Rockville, MD (US); Nadejda Reingand, Baltimore, MD (US)

(73) Assignee: CeLight, Inc., Silver Spring, MD (US)

( * ) Notice: Subject to any disclaimer, the term of this patent is extended or adjusted under 35 U.S.C. 154(b) by 0 days.

(21) Appl. No.: 11/947,058

(22) Filed: Nov. 29, 2007

Related U.S. Application Data

(63) Continuation-in-part of application No. 11/626,920, filed on Jan. 25, 2007.

(60) Provisional application No. 60/883,420, filed on Jan. 4, 2007.

(51) Int. Cl.
*G01N 23/00* (2006.01)
*G01N 23/201* (2006.01)

(52) U.S. Cl. .............. 250/358.1; 250/251; 250/336.1; 250/397

(58) Field of Classification Search .............. None
See application file for complete search history.

(56) References Cited

U.S. PATENT DOCUMENTS 4,504,438 A  3/1985 Levy
6,727,503 B1 * 4/2004 Gerstenmayer ........ 250/370.09
7,015,475 B2  3/2006 Hailey
7,183,554 B2 * 2/2007 Gallagher et al. ........ 250/358.1
7,301,150 B2 * 11/2007 Hailey .................... 250/358.1

OTHER PUBLICATIONS

Priedhorsky et al., Detection of high-Z objects using multiple scattering of cosmic ray muons, Oct. 2003, Review of Scientific Instruments, vol. 74, No. 10, pp. 4294-4297.*

Konstantin N. Borozdin, et. al., "Scattering Moun Radiography and Its Application to the Detection of High-Z Materials" (Nuclear Science Symposium Conference Record, 2003 IEEE, p. 19-25 Oct. 2003, vol. 2, 1061-1064 vol. 2).*

* cited by examiner

*Primary Examiner*—David A. Vanore
(74) *Attorney, Agent, or Firm*—Nadejda Reingand

(57) ABSTRACT

A method and system for high Z substance revealing using muon detection technique is presented. Natural muon coordinate and incidence angle are measured above and below the interrogated volume. The data on muons trajectory change caused by the presence of high Z material and the muons time of flight between the upper and lower muon detectors are used for the decision making on the presence of a nuclear substance inside the volume. The system is adapted for performing measurements on moving objects such as moving trucks.

20 Claims, 6 Drawing Sheets

HIGH Z MATERIAL DETECTION SYSTEM AND METHOD

CROSS-REFERENCE TO RELATED APPLICATIONS

The present invention claims is a continuation-in-part of U.S. Ser. No. 11/626,920, filed Jan. 25, 2007 and U.S. provisional application Ser. No. 60/883,420, filed Jan. 4, 2007, which are fully incorporated herein by reference.

FIELD OF INVENTION

This invention relates generally to the systems and methods for revealing hidden uranium, plutonium and other high Z materials using muon detection technique.

BACKGROUND OF THE INVENTION

Flow of cosmic rays constantly bombards Earth. Primary cosmic rays consist of single protons (about 90% of all cosmic rays) and alpha particles (majority of the remaining 10%). When these primary cosmic rays hit Earth's atmosphere at around 30,000 m above the surface, the impacts cause nuclear reactions, which produce pions. These pions decay into a muon and muon neutrino at about 9000 m altitude. Many muons decay on the way down into neutrinos and an electron while others reach the surface, and there are still enough particles to be detected fairly easily. About 10,000 muons rain down on each square meter of Earth every minute. This flux is approximately uniform over the Earth's surface.

Muons are electrically charged unstable elementary particles with a mean energy of about 3 GeV, which rain down upon the surface of the earth, traveling at about 0.998 c, where c is a speed of light. The muon has an average half-life of $2.2 \cdot 10^{-6}$ s. The angular distribution of the muons is proportional to $\cos^2 \alpha$, where $\alpha$ is calculated from the vertical direction.

Cosmic muons observed at sea level come from the decay of unstable pions produced in the upper part of the atmosphere in amounts decreasing with decreasing altitude starting downwards from about 10,000 meters. These pions are produced in nuclear collisions with the air of extraterrestrial protons and a small amount of other nuclei. The muons are not monoenergetic. FIG. 1 shows the most recent and most accurate measurements of the momentum p of the muons, presented by David Gertsle in "Cosmic ray flux study", Oct. 17, 2007. Here muon energy E is related to the momentum and the muon mass m by Einstein's formula $E^2 = p^2 + m^2$.

Various detection techniques were proposed for muons detectors. Muon detectors described below are presented here for the purpose of proof of the systems feasibility. However it does not limit the concept of the present invention to this particular type of detectors.

Cloud chambers with supersaturated vapor can be named as the most popular type of detectors. Cloud chambers allow visualization of muon trajectory. If the chamber is equipped with a three-dimensional coordinate system, the muon incident angle and coordinate can be measured.

The most suitable types of muon detectors for the current system are wire chambers and drift chambers. The wire chambers consist of very large number of parallel wires, where each wire acts as an individual detector. A particle leaves a trace of ions and electrons, which drift toward the nearest wire. By marking off the wires which had a pulse of current, one can see the particle's path. Several planes of wires with different orientations are used to determine the position of the particle very accurately. One embodiment of wire chamber detectors is shown in FIG. 2. Typically the chamber 1 has two windows 2 and 2a. Gas pump 3 is connected with the chamber by inlet and outlet pipes 4 and 5. Three wire gratings are inserted between the windows: two cathode wire planes 6 and 7 and a sense wire plane 8 located in between. Output 9 yields a signal caused by a muon passing through the chamber. Varying voltages applied from the source 10 to the cathode wires produce a field in which ionization electrons drift at a constant velocity towards the nearest sense wire. The drift time, measured by an electronic "stopwatch" started by a signal from a scintillator 2, is directly related to the distance between the track of the particle and the wire that produces a signal. This greatly increases the accuracy of the path reconstruction.

Alternatively drift chambers can be implemented for muon coordinate measurement in the present invention. The coordinate resolution in best muon detectors (such as drift tubes) can be as good as 50 micrometers.

Additionally, a scintillation fiber detector may be used for muon sensing. Such detector has a good spatial resolution. They can be made by forming layers of plastic optical fibers made out of scintillator material coated with a lower refractive index cladding. These can typically have a diameter of 0.5 to 1 mm. The small size of each independent scintillator means that many readout channels (typically tens of thousands) are required, and it is not practical to equip each one with its own photomultiplier. One solution to this is to gather the fibers into a bundle and connect to an image intensifier. This amplifies the light while maintaining an image, which can then be viewed with a CCD camera, and the position on the image associated with a particular fiber.

Since other particles are stimulating the detector as well, a system of two detectors was proposed to avoid false muon detection. Other particles originating from i.e. terrestrial radiation will also cause stimulation, but those particles have too less energy to penetrate both detectors. They will end up either in the first detector or shortly after it. The detection that occurs almost instant in both detectors is considered as a successful detection of a muon. Muons shielding is not limited to above mentioned additional detector; any other types of shielding can be in order to separate muons from other charged particles.

A sandwich of two coordinate detectors located along the muon path allows simultaneous detecting both the incident angle of the muon and its coordinate.

It is known that muons easily penetrate most of the materials. However an increase of the muon deflection is observed when they pass materials with high atomic number Z such as nuclear or gamma-ray-shielding materials. Two materials that can be used to make an atomic bomb: plutonium-239 and highly enriched uranium with at least 20 percent of uranium-235. Since both materials have high Z numbers, both can be detected by muon technique. Probability of muon deflection angle forms a Gaussian function with a zero mean angle and a width that depends on the material Z number. While muon deflection in 10 cm of aluminum is up to about 10 milliradians, it reaches a value of about 80 milliradians in uranium and plutonium.

Current technologies for nuclear material detection are limited to X-ray and Gamma ray equipment. Both systems must be accurately handled, and their emissions properly controlled. There is a need for reliable and safety system to unveil hidden nuclear materials. Muon detection technique provides a safety alternative with improved penetration ability. The present invention is a continuation-in-part of US Patent Application No. 20070102648, which discloses a system and method for nuclear material detection using muons; this patent application is fully incorporated herein by reference. Since cosmic muons are not monoenergetic, the distribution of the scattering angle depends on the muon energy, the atomic number Z of the material, and the thickness of materials traversed by the muon. There is a need to take into account the distribution of muons' energies when an observation of muon scattering caused by high Z material is performed.

SUMMARY OF THE INVENTION

The system and method are disclosed for nuclear materials detection by muon flow sensing. The system comprises a series of muon detectors for efficiently measuring muons deflection caused by the presence of high Z materials.

The presence of high Z material is suspected inside the interrogated volume when an average deflection of multiple muons, registered by the system, is above some predetermined value. In the preferred embodiment a distribution width of muon trajectory angles is measured and compared with an expected width, which will be in absence of high Z material. A criterion for a positive detection of the high Z material is a difference between the actual (measured) and the expected statistics of muon angles. When it exceeds a predetermined difference value, the presence of high Z material is suspected. The predetermined difference value depends on a measurement time. In the preferred embodiment the measurement time is at least one minute. In one embodiment the predetermined difference value provides probability of positive detection above 90%. In another embodiment the predetermined difference value is 1 mrad.

In the preferred embodiment, the system comprises an angular measuring unit for angular measurement of the muon trajectory with an accuracy of at least 1 mrad. The system also comprises a coordinate measuring unit for coordinate measurement for each muon passing the system with a resolution of at least 2 mm.

In the preferred embodiment the system includes a unit for measuring a transit time for each particular muon entering the system. This also allows taking into consideration the trajectory dependence on the muon velocity leading to more accurate determination of the presence of high Z material. In one embodiment the data processing unit eliminates fault detection caused by low energy muons.

In the preferred embodiment the measurement is performed when a vehicle or container passes through the space surrounded by detectors. The digital signal processing unit stores the position of the vehicle associated with each muons entering the system during the measurement time T and performs calculation of the actual statistics of the actual leaving angle basing on statistics of muon penetration of each part of the moving vehicle.

The electrical output signals from the detectors are processed in DSP unit connected to an alarm system to produce a signal if the presence of nuclear material is suspected inside the interrogated volume.

Another object of the present invention is a method for high Z material revealing, comprising continuously measuring an incident angle of each incoming muon by a first detector; estimating an expected statistics of an expected leaving angle at a second detector for each incoming muon; continuously measuring an actual leaving angle for each incoming muon by the second detector; storing a data on the incident, the actual and the expected leaving angles; calculating an actual statistics of the actual leaving angle; finding a difference between the expected and the actual statistics; and determining a presence of high Z material in between the first and the second muon detector when the difference exceeds a predetermined difference value. In the preferred embodiment the method also includes measuring a time of flight for each particle registered by the first muon detector, and eliminating a contribution of particles that have time of flight larger than a predetermined time value.

DETAILED DESCRIPTION OF THE PREFERRED EMBODIMENT

The present invention now will be described more fully hereinafter with reference to the accompanying drawings, in which the preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
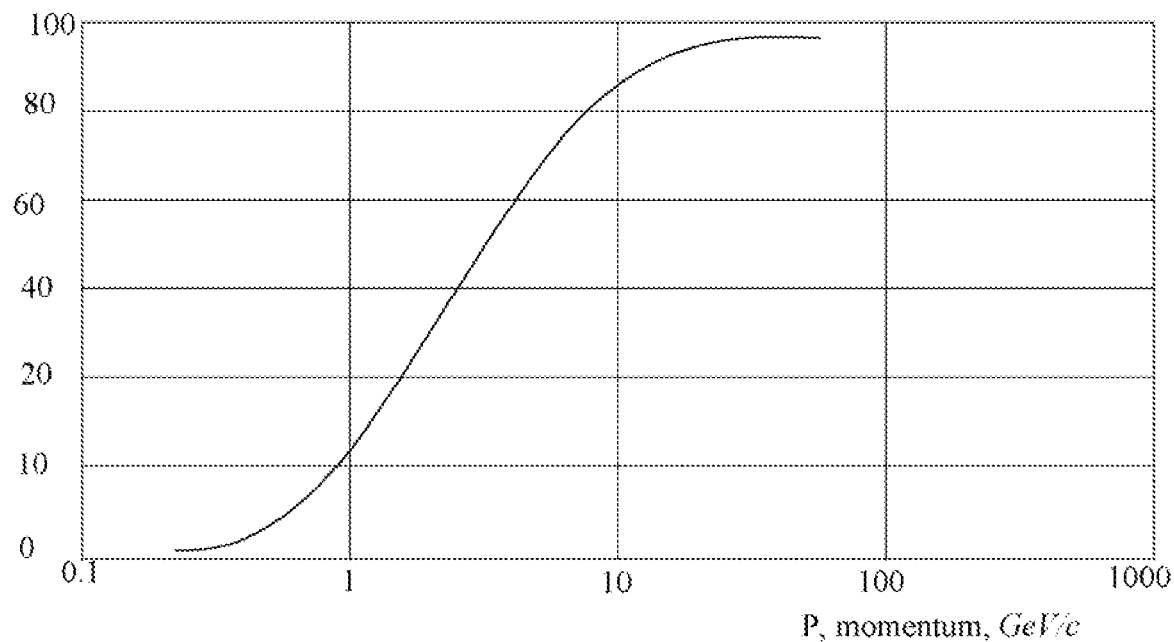
FIG. 1 Momentum distribution of atmospheric muons.
Figure 2:
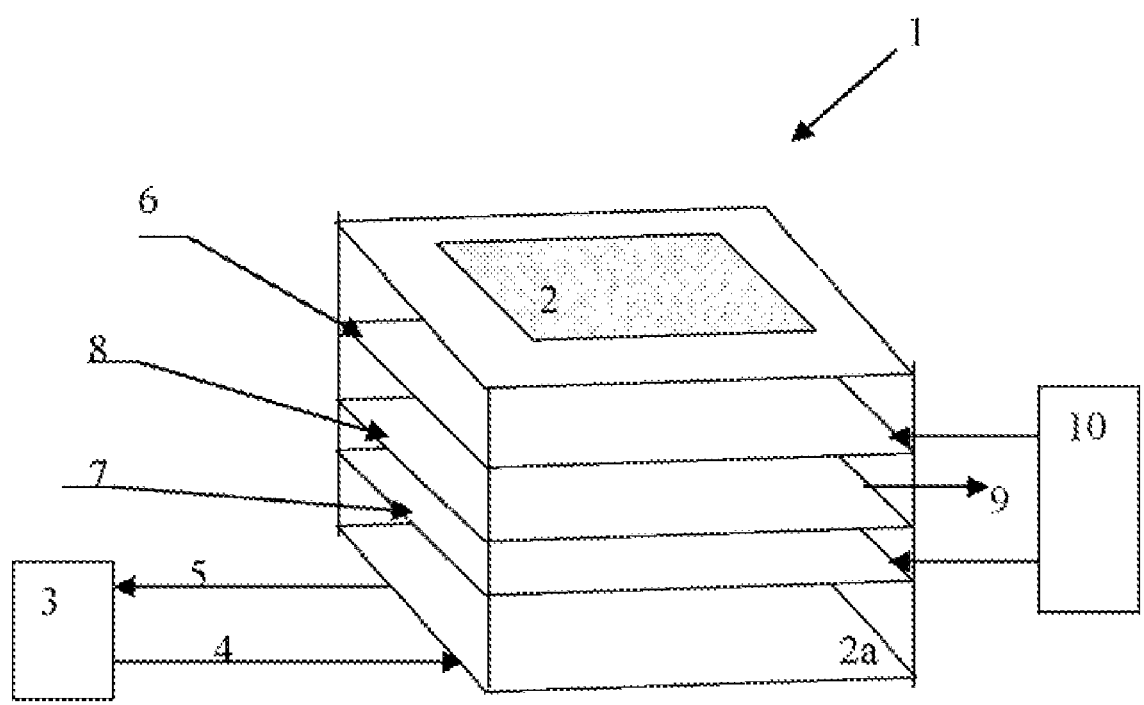
FIG. 2 A muon detector for coordinate measurement (Prior art).
Figure 3:
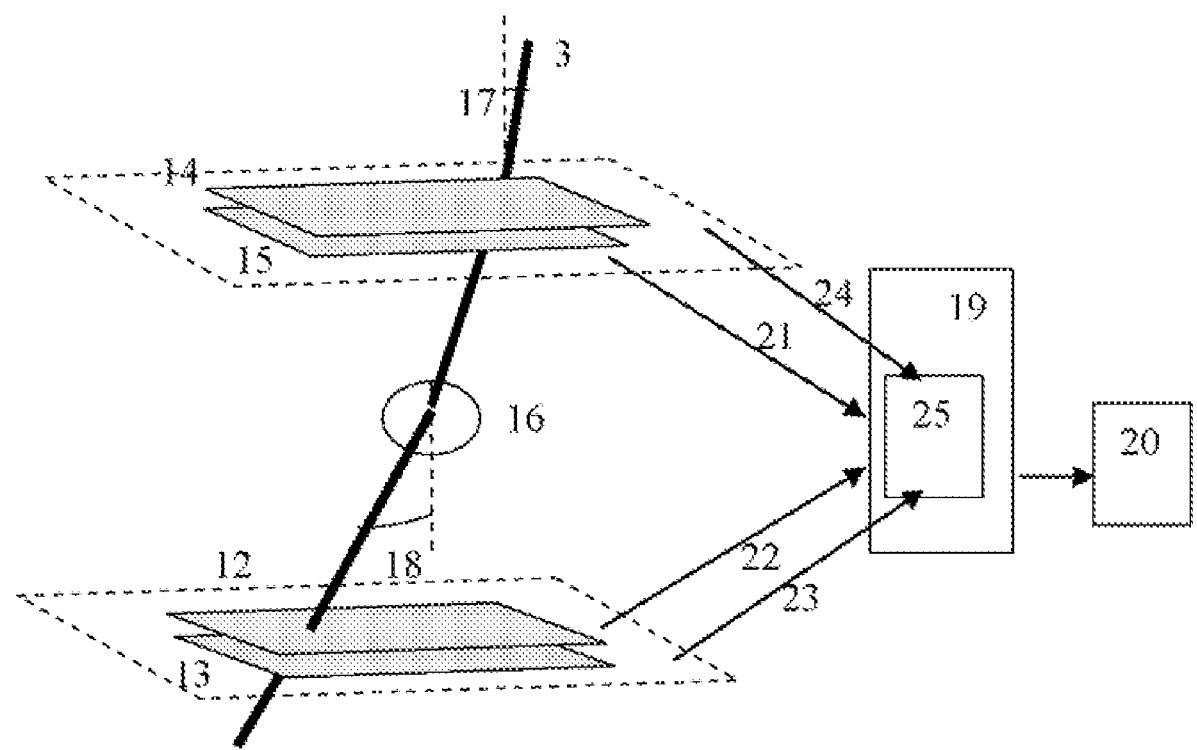
FIG. 3 A system for measurement of muon deflection caused by high Z material.

In one embodiment of the present invention, a system for high Z material detection is proposed as shown in FIG. 3. In the preferred embodiment two detectors 12 and 13 are positioned below the interrogated area, for example, on the ground or under the ground. Similar muon detectors 14 and 15 are positioned above the ground level. Each group of the detectors 12,13 and 14,15 allows measuring the muon incidence angle with an accuracy of at least 1 milliradian and muon coordinate with an accuracy of at least 1 millimeter. In the absence of high Z material between upper and lower detectors the muon incidence angle is the same as its leaving angle. In the presence of high Z material 16 a muon deflection is observed. The incidence angle 17 at the top sensor 14,15 differs from the leaving angle 18 at the bottom sensor 12, 13. In fact the muon deflection is more complicated multiscattering process, and FIG. 3 represents a simplified case. Each sensor constantly registers flow of muons passing through. The coordinate and incidence angle for each muon are measured at the top sensor 14, 15. These data is used in a Digital Signal Processing (DSP) unit 19 to calculate the expected muon coordinate and leaving angle at the bottom sensor 12, 13. The expected coordinate and leaving angle are calculated assuming absence of high Z material between the top and the bottom detectors. An actual coordinate and leaving angle are compared with the expected ones. A statistical parameter associated with the actual measurement is compared with the same statistical parameter of the expected data. An alarm system 20 generates an alarm if a deviation between the actual and expected data exceeding a predetermined difference value is observed. In the preferred embodiment the statistical parameter is the angle distribution width, and the predetermined difference value is about 1 milliradian. The predetermined difference value that triggers the alarm depends on an exposure time T. The longer time T allows achieving higher probability of a positive detection. In the preferred embodiment the exposure time is at least one minute. In one embodiment the predetermined different value is chosen to provide the probability of the positive detection above 90%. The predetermined difference value also depends on geometrical parameters of the system and a type and size of object under investigation. A predetermined trigger value of deviation may be chosen from 0.1 to 100 milliradian. In the preferred embodiment the predetermined trigger value of the deviation is 1 milliradian. Large size muon detectors are preferable for the disclosed system. For example, a muon detector of at least 1 square meter size must be used to detect hidden nuclear materials in cargo. The distance between the first and the second muon detectors may be from 10 cm to 5 meters.

Figure 4:
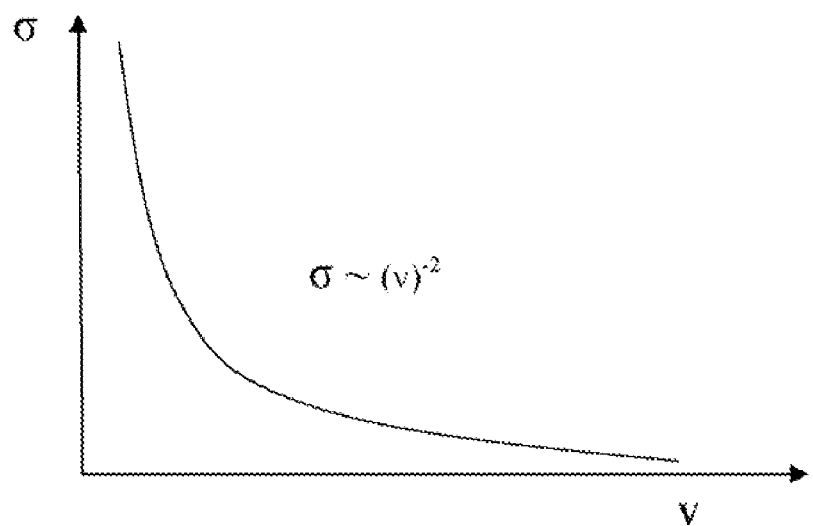
FIG. 4 The width of muon deflection angle vs. the muon velocity.

While a muon traverses high Z material, it experiences electrical interaction with the material atoms and undergoes a large number of scattering. The probability distribution of the resulting deflection angle is characterized by a width $\sigma$ in three-dimensional space, $\sigma^2 = \sigma_1^2 + \sigma_2^2$, where $\sigma_1$ and $\sigma_2$ are the plane projections. The width is expresses by Moliere formula as following:

$$\sigma^2 = (0.015/vP)^2 (X/X_0)[1 + 0.2 \log(X/X_0)]^2$$

where X is the thickness traversed, P the momentum and v the velocity of the muon, and radiation length $X_0$ is a characteristic of the traversed material, equal to 300 m for air, 9 cm for Aluminum, 1.8 cm for Iron, 0.56 cm for Lead, 0.32 cm for Uranium. The width $\sigma$ is in inverse proportion to the squared velocity as shown in FIG. 4. Obviously, slow muons experience a large scattering on various types of materials, and this effect must be taken into consideration. In one embodiment the distribution width dependence on the muon velocity is taken into account, when the measurement data is processed in the DSP unit 19. The amount of muons with energy below 1 GeV is about 25% in the atmospheric flow, therefore it is important to take into account the deflection dependence on the muon velocity into the final calculations to improve the system accuracy and reliability. In another embodiment, the contribution of slow muons with energy below 1 GeV is eliminated from the final calculations to avoid false alarms of the system.

Figure 5:
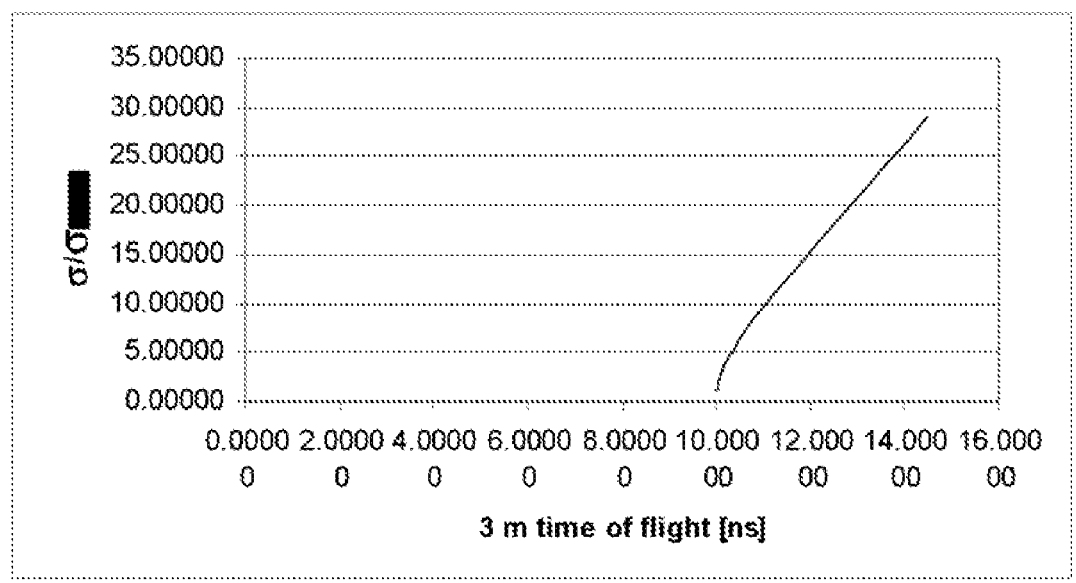
FIG. 5 The width of muon deflection angle vs. the time of flight.

Low-energy muons may produce false positive signals, i.e. large scattering in materials, even in absence of high Z substance. High-energy muons may be deflected at rather small angles, but still can provide important data on the high-z material presence inside the interrogated volume. The width of the angles distribution vs. the muon time of flight between the upper and lower detectors is shown in FIG. 5. An estimation of the muon energy is carried out basing on measuring the muon transit time between upper 14, and lower 12, 13 detectors. The actual transit time is measured using pulses generated by a clock associated with scintillation counter 2. Counting is started by a signal produced by the muon passing through the top detector and stopped by a signal in the scintillation counter at the bottom detector. Both signals from the upper and lower detectors are transmitted via channels 23 and 24 (FIG. 3) into a time measuring unit 25, which is a part of the DSP unit 19. The time of flight depends on the system parameters: the total distance between the upper and lower detectors, the scintillation counter jitters and the scintillation counter performance vs. the speed of the clock. In the preferred embodiment scintillator BC422Q from Saint Gobain, Valley Forge, Pa. with response within 0.7 ns was implemented.

A variety of charged particles triggers the detectors 14 and 15. Some particles with a very low energy level do not get in touch with the detector 15. Particles with higher energy level can reach the lower set of the detectors 12, 13. Only those particles that were registered by all four detectors 12, 13, 14, and 15 are processed in the digital signal processing unit 19. The system of four detectors automatically performs muon selection since other particles do not possess enough energy to penetrate all four detectors.

Since low-energy muons may provide false information on the presence of high-z material by providing data with relatively large deflection angles, in one embodiment the contribution of muons having energies below 1 Gev/c were excluded from the final calculations.

Figure 6:
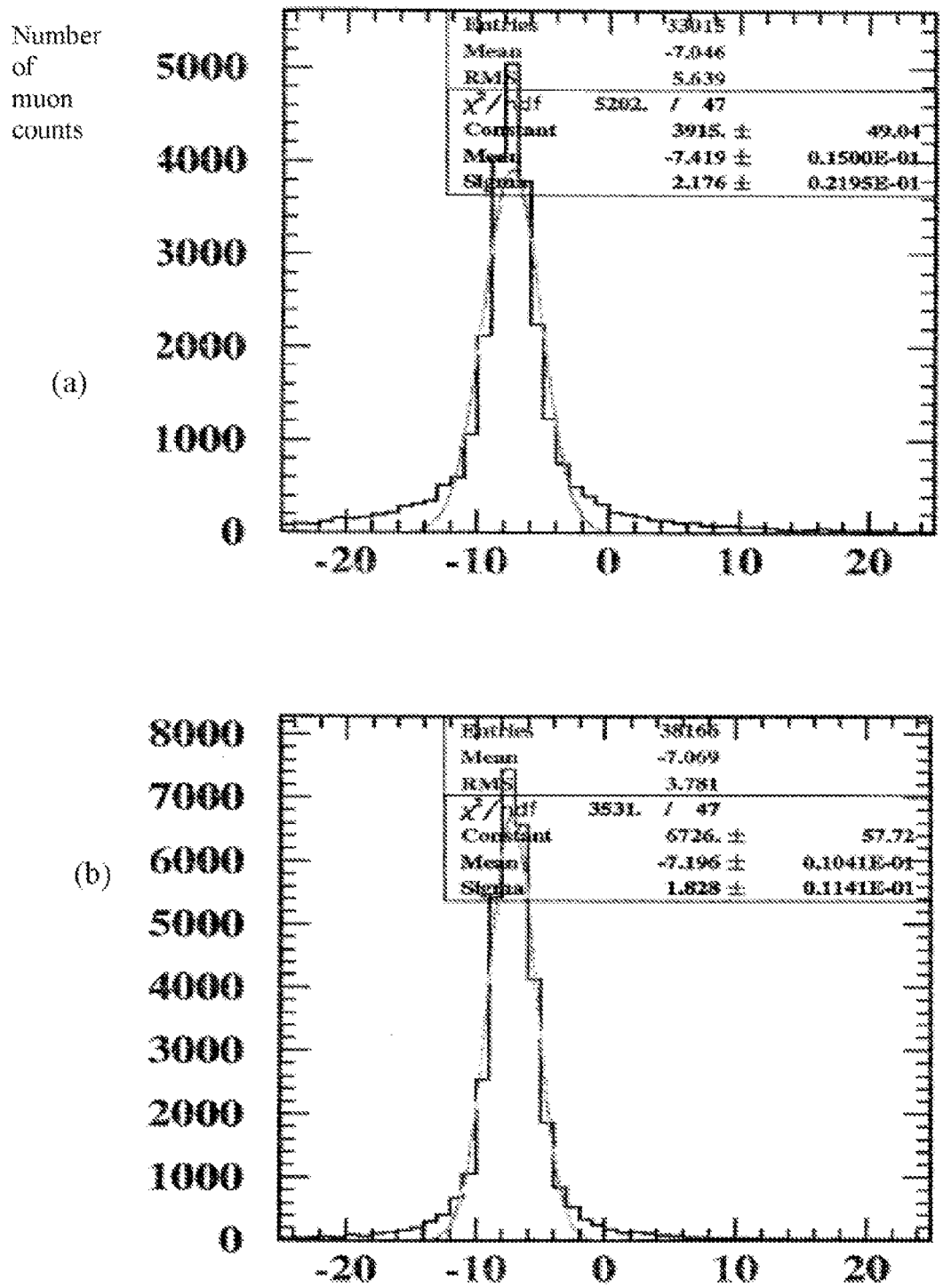
FIG. 6 Experimental results of muon deflection in the system (a) with lead, and (b) without lead in between the detectors.

FIG. 6 represents the experimental results that demonstrate the system performance. FIG. 6(a) presents the experimental results of the deflection angle measurement when a thick layer of lead was placed in between the upper and lower detectors. Similar measurements without lead are shown in FIG. 5(b). The increase of Sigma (angle distribution width) from 1.8 to 2.1 mrad is observed.

In one embodiment the suspicious container or vehicle is placed in between the top and the bottom detectors, and the muon deflection is measured. Alternatively the measurement is performed when a vehicle with the container moves through the system of detectors.

Figure 7:
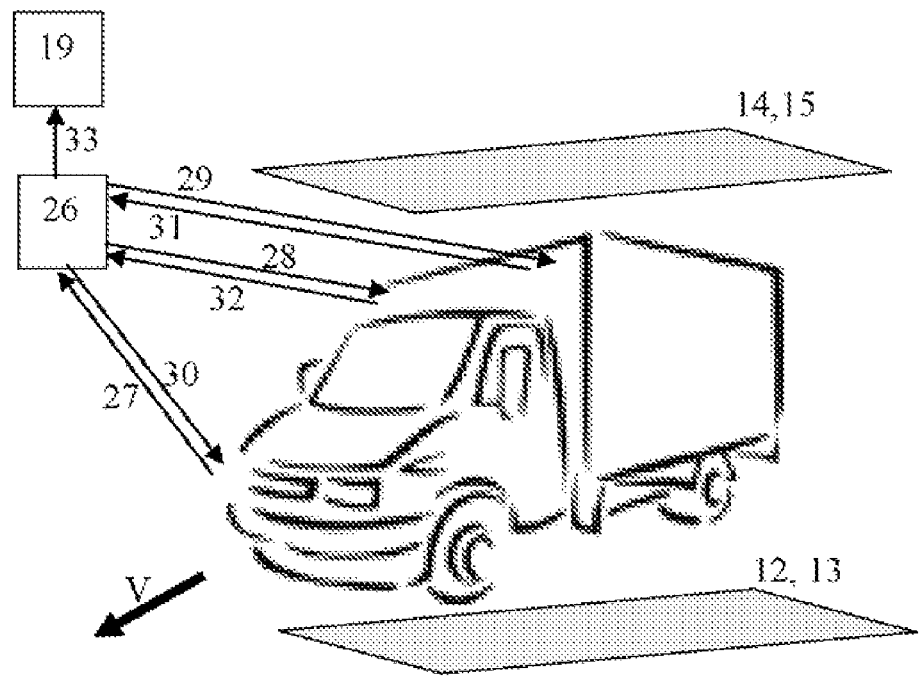
FIG. 7 A vehicle passing through the system of muon detectors.

A vehicle passing through the system of muon sensors is shown in FIG. 7. Since the speed of muon essentially exceeds the speed of a moving truck, the truck motion does not affect the measurement of muon trajectory. The speed of the truck and the size of the detector must assure measurement of at least one muon trajectory in each square of 100 cm$^2$ of the truck surface, which is parallel to the ground. For example, for a 9 sq. meter detector (3×3), a vehicle moving at a speed of 10 km/hour guarantees measuring muon trajectories for each 100 cm$^2$ of its surface parallel to the ground. It is obvious that the detector of large size improves the accuracy of the measurement. A series of detector systems positioned along the way of the vehicle improves sampling and thus reduces false alarm.

In the preferred embodiment at least 10 muons are registered for each square of 100 cm$^2$ of the truck surface. It is another object of the present invention to detect a high Z material position inside the volume between muon detectors. The digital processing unit collects information about muon deflection in different parts of the truck. The muon angles measurement results are collected in connection with the truck position and dimensions. The coordinate-deflection concordance is performed in digital signal processing unit 19 (FIG. 7) basing on incoming information on the input and output angle of the deflected muon, the muon energy, which is estimated by measuring of time-of-flight, and the vehicle velocity, dimensions and location, the latter measured in a position measuring unit 26. In the preferred embodiment the truck position and dimensions are measured optically by sending laser beams 27-29 towards the truck and receiving reflected light beams 30-32. The number of light beams can be from 1 to 100 and their direction is chosen to optimize the parameter measuring of the truck or container or another interrogated object. The vehicle location and dimensions are measured with a range finder, and its velocity is measured with optical or acoustic radar. In the preferred embodiment doubled pulse coherent laser radar is implemented for the range and velocity measurement as disclosed in U.S. Pat. No.

5,815,250 by Thomson et al. This technique allows achieving 0.1 mm/s precision in the vehicle velocity measurement.

The muon detectors may be manufactured being hidden or camouflaged in the environment. The bottom sensor or U-shaped system of sensors may be positioned under the ground.

Figure 8:
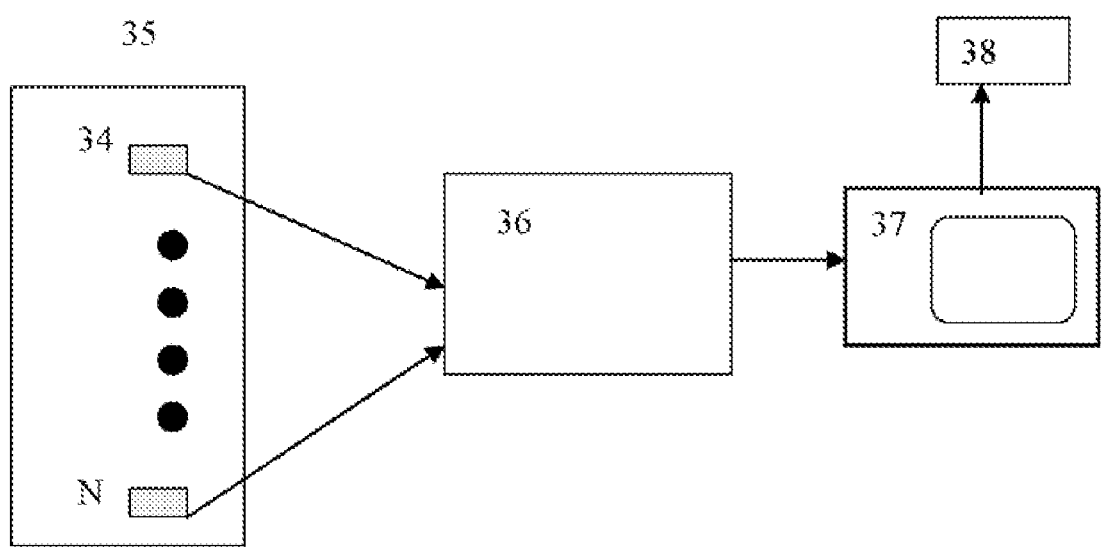
FIG. 8 A digital signal processing unit for processing and display of data from multiple detectors.

FIG. 8 depicts the processing of data from a number of sensors 34 . . . N. The system 35 of sensors 34 . . . N registers spatial and temporal appearance of muons. Data from all sensors 34 . . . N enters digital signal processing (DSP) unit 36, where the expected trajectory of each particular muon is calculated and compared with the measured result. The results of the data analysis are shown on display 37. If the deviation of the measured parameter differs from the calculated one more than a predetermined value, an alarm 38 starts. The alarm 38 may be audible or visual alarm.

Security check point with muon detector may be combined with other sensor equipment.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

The system allows fast detection of nuclear materials when the traffic passes through the detection area without stopping vehicles. The system can be installed on roads, in tunnels, in cargo station, in seaports and other locations. Toll stations could be convenient places for installations of such nuclear material detectors. The similar system of sensors may be installed at luggage transportation conveyor.

The invention claimed is:

1. A system for a high Z material detection, comprising:
    at least a first muon detector and a second muon detector positioned essentially parallel to each other, the first muon detector is indicative of an incidence angle, and the second muon detector is indicative of an actual leaving angle for each muon passing the system;
    a digital signal processing unit for
        storing a data on the incidence and the actual leaving angle for muons passing the system during an exposure time T;
        calculating an actual statistics of the actual leaving angles and an expected statistics of expected leaving angles, wherein the expected statistics of the expected leaving angle is estimated assuming absence of the high Z material in between the first and the second muon detector;
        finding a difference between the actual and the expected statistics; and
        determining a presence of the high Z material inside the system when the difference is above a predetermined difference value.

2. The system according to claim 1, wherein the actual statistics and the expected statistics are an actual and expected distribution widths.

3. The system according to claim 2, wherein the predetermined difference value is 1 mrad.

4. The system according to claim 1, wherein the predetermined difference value depends on the exposure time T.

5. The system according to claim 1, wherein the predetermined difference value providing probability of a positive detection above 90%.

6. The system according to claim 1, wherein the first and the second muon detectors are flat detectors of at least 1 square meters each.

7. The system according to claim 1, wherein the measurement time T is at least one minute.

8. The system according to claim 1, wherein the first and the second muon detectors each comprises an angular measuring unit for angular measurement of a muon trajectory with an accuracy of at least 1 mrad.

9. The system according to claim 1, wherein the first and the second muon detectors each comprises a coordinate measuring unit for coordinate measurement for each muon passing the system with a resolution of at least 2 mm.

10. The system according to claim 1, further comprising:
    a time measuring unit to measure a time of flight of each muon between the first and the second muon detectors; and
    the digital signal processing unit being used for computation of a muon velocity basing on the measured time of flight and for calculation of the expected statistics depending on the computed muon velocity.

11. The system according to claim 10, wherein a contribution of muons having the measured time of flight larger than a predetermined time of flight value is eliminated from consideration by the digital signal processing unit when determining the presence of high Z material in the system.

12. The system according to claim 10, wherein the time measuring unit is a clock associated with the first and the second muon detector, the clock being initiated by a muon penetrating the first muon detector and being stopped by the muon leaving the second muon detector.

13. The system according to claim 12, wherein a time resolution of the clock is 1 ns or better.

14. The system according to claim 1, wherein the first and the second muon detectors each comprises a scintillator counter for measurement of a time for each muon passing each detector.

15. The system according to claim 1, wherein the first and the second muon detectors each comprises at least two flat wire detectors.

16. The system according to claim 15, wherein the wire detector is a gas chamber with at least one wire grid.

17. The system according to claim 1, further comprising an indication system to produce a signal when the presence of the high Z material in the system is suspected.

18. The system according to claim 1, further comprising a position measuring unit for measuring a position of a vehicle moving in between the first and the second muon detector;
    the digital signal processing unit storing the position of the vehicle associated with each muons entering the system during the exposure time T;
    performing calculation of the actual statistics of the actual leaving angle basing on statistics of muon penetration of each part of the moving vehicle.

19. A method for high Z material revealing, comprising:
    continuously measuring an incident angle of each incoming muon by a first detector;
    estimating an expected statistics of an expected leaving angle at a second detector for each incoming muon;
    continuously measuring an actual leaving angle for each incoming muon by the second detector;
    storing a data on the incident, the actual and the expected leaving angles;

calculating an actual statistics of the actual leaving angle;
finding a difference between the expected and the actual statistics; and
determining a presence of high Z material in between the first and the second muon detector when the difference exceeds a predetermined difference value.

20. The method according to claim 19, further comprising:
measuring a time of flight for each muon registered by the first muon detector, and calculating the expected statistics depending on the muon time of flight.

* * * * *